United States Patent
Li et al.

(10) Patent No.: US 12,506,412 B2
(45) Date of Patent: Dec. 23, 2025

(54) POWER MANAGEMENT SYSTEMS

(71) Applicant: O2Micro Inc., Santa Clara, CA (US)

(72) Inventors: Guoxing Li, Sunnyvale, CA (US);
Gang Li, Chengdu (CN)

(73) Assignee: O2Micro, Inc., Santa Clara, CA (US)

( * ) Notice: Subject to any disclaimer, the term of this patent is extended or adjusted under 35 U.S.C. 154(b) by 316 days.

(21) Appl. No.: 18/487,941

(22) Filed: Oct. 16, 2023

(65) Prior Publication Data
US 2025/0125728 A1 Apr. 17, 2025

(51) Int. Cl.
*H02M 3/158* (2006.01)
*H02M 1/00* (2006.01)

(52) U.S. Cl.
CPC ....... *H02M 3/1584* (2013.01); *H02M 1/0025* (2021.05)

(58) Field of Classification Search
CPC .................................................. H02M 3/1584
See application file for complete search history.

(56) References Cited

U.S. PATENT DOCUMENTS

| | | | | |
|---|---|---|---|---|
| 11,864,862 B2 * | 1/2024 | Moor | ...................... | G01R 33/36 |
| 2009/0195071 A1 * | 8/2009 | Furuse | .................. | H02M 3/156 307/31 |
| 2011/0280299 A1 * | 11/2011 | O'Malley | ............ | H03K 5/1565 375/238 |
| 2021/0184683 A1 * | 6/2021 | Nam | ...................... | H02M 3/158 |
| 2022/0158545 A1 * | 5/2022 | Tan | ..................... | H02M 3/1586 |
| 2023/0014541 A1 * | 1/2023 | Lee | ........................ | H02J 1/102 |

OTHER PUBLICATIONS

A datasheet DS1090 entitled "Low-Frequency, Spread-Spectrum EconOscillator," issued by Dallas Semiconductor, Rev 0; Apr. 2004, and published before Oct. 16, 2023. Applicants could not find the information for the publication date of this datasheet but confirmed that this datasheet was published before the filing date of the instant patent application.

A datasheet EZ-PD CCG4 entitled "USB Type-C Port Controller," issued by Cypress, revised on Nov. 15, 2019, with document No. 001-98440 Rev. * L, and published before Oct. 16, 2023. Applicants could not find the information for the publication date of this datasheet but confirmed that this datasheet was published before the filing date of the instant patent application.

* cited by examiner

*Primary Examiner* — Rexford N Barnie
*Assistant Examiner* — Esayas G Yeshaw

(57) ABSTRACT

A power management system includes a first switching regulator, a second switching regulator, and a power delivery (PD) controller. The first switching regulator is configured to convert a first input power generated by a power source circuit to a first output power provided to a first connector, and generate a synchronization signal. The second switching regulator is configured to convert a second input power generated by the power source circuit to a second output power provided to a second connector, and synchronize its operating state with an operating state of the first switching regulator according to the synchronization signal. The PD controller is configured to control the first switching regulator to adjust the first output power according to a first negotiation signal provided by the first connector, and control the second switching regulator to adjust the second output power according to a second negotiation signal provided by the second connector.

20 Claims, 5 Drawing Sheets

POWER MANAGEMENT SYSTEMS

BACKGROUND

FIG. 1 illustrates a circuit diagram of a conventional power management system 100. As shown in FIG. 1, the power management system 100 includes a first switching regulator 110 and a second switching regulator 130. The first switching regulator 110 is coupled to a universal serial bus (USB) type-C connector (e.g., TYPE-C1 shown in FIG. 1) and a power source circuit. The second switching regulator 130 is coupled to a connector TYPE-C2 and the power source circuit. The first switching regulator 110 includes a conversion circuit 111, a switching controller, and a power delivery (PD) controller. The second switching regulator 130 includes a conversion circuit 131, a switching controller, and a PD controller.

The power management system 100 can power two devices through the USB type-C connectors TYPE-C1 and TYPE-C2, respectively. More specifically, the first switching regulator 110 can convert an input power generated by the power source circuit to an output power provided to the connector TYPE-C1 to power one of the devices. Similarly, the second switching regulator 130 can convert an input power generated by the power source circuit to an output power provided to the connector TYPE-C2 to power the other one of the devices.

The conventional power management system 100 has some drawbacks. For example, the total bill of materials (BOM) cost of the power management system 100 is relatively high. The power management system 100 may produce relatively high electromagnetic interference (EMI) noises when the switching regulators 110 and 130 are operating in parallel. Additionally, because the first switching regulator 110 and the second switching regulator 130 independently convert the output power generated by the power source circuit, the first switching regulator 110 may compete with the second switching regulator 130 for the output power generated by the power source circuit and, as a result, the amounts of output power respectively distributed to the first switching regulator 110 and the second switching regulator 130 are unpredictable and may be unsuitable.

SUMMARY

In an embodiment, a power management system includes a first switching regulator, a second switching regulator, and a power delivery (PD) controller coupled to the first switching regulator and the second switching regulator. The first switching regulator is configured to convert a first input power generated by a power source circuit to a first output power provided to a first connector, and is also configured to generate a synchronization signal. The second switching regulator is coupled to the first switching regulator. The second switching regulator is configured to convert a second input power generated by the power source circuit to a second output power provided to a second connector, and is also configured to synchronize an operating state of the second switching regulator with an operating state of the first switching regulator according to the synchronization signal. The PD controller is configured to control the first switching regulator to adjust the first output power according to a first negotiation signal provided by the first connector, and is also configured to control the second switching regulator to adjust the second output power according to a second negotiation signal provided by the second connector.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications, and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments according to the present invention provide a power management system, a power management circuit, and a method of managing power. The power management system includes a first switching regulator, a second switching regulator, and a PD (power delivery) controller. By using the PD controller to control the first switching regulator and the second switching regulator, the total BOM (total bill of materials) cost of the power management system can be reduced, and the output power generated by a power source circuit can be appropriately distributed to the first and second switching regulators. Additionally, the first switching regulator can send a synchronization signal to the second switching regulator. The synchronization signal is used to instruct the second switching regulator to synchronize with the operating state of the first switching regulator, so that the power management system can reduce (or eliminate) EMI (electromagnetic interference) noises when the first switching regulator and the second switching regulator are operating in parallel.

Examples of the power management system, power management circuit, and power management method are described below with reference to FIG. 2, FIG. 3, and FIG. 4.

Figure 2:
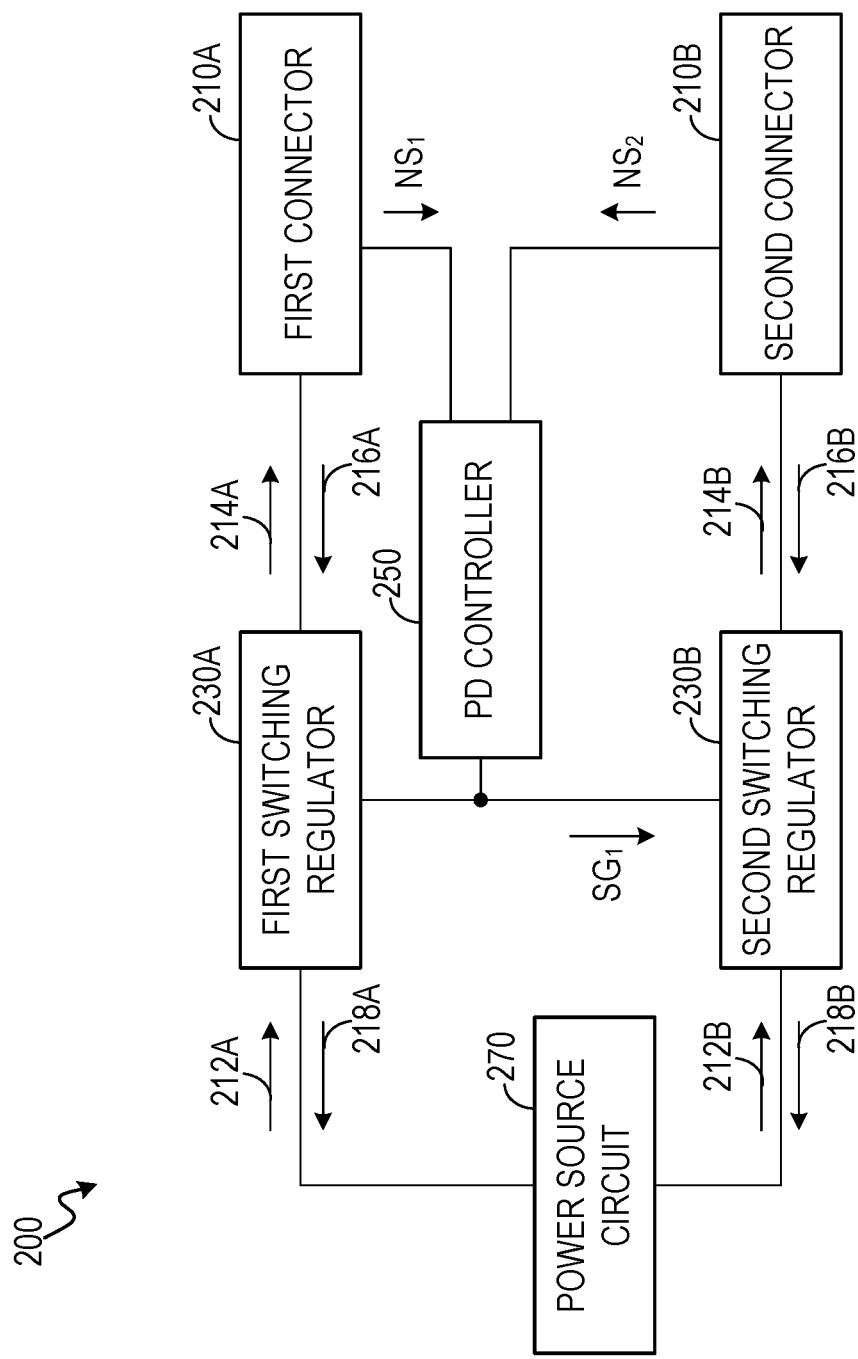
FIG. 2 illustrates a circuit diagram of an example of a power management system, in an embodiment of the present invention.

FIG. 2 illustrates a circuit diagram of an example of a power management system 200, in an embodiment of the present invention. The power management system 200 can manage power for a power source circuit 270. As shown in FIG. 2, the power management system 200 includes a first switching regulator 230A, a second switching regulator 230B, and a PD controller 250. The power management system 200 may also include a first connector 210A and a second connector 210B.

As shown in FIG. 2, the power source circuit 270 is coupled to the first switching regulator 230A and the second switching regulator 230B. The power source circuit 270 can generate a first input power 212A provided to the first switching regulator 230A, and a second input power 212B provided to the second switching regulator 230B. In an embodiment, the power source circuit 270 can include one or more rechargeable batteries, e.g., lithium-ion (Li-ion) batteries. In other embodiments, the power source circuit 270 may include other types of rechargeable batteries such as lead-acid batteries, nickel-cadmium (NiCd) batteries, nickel-metal hydride (NiMH) batteries, etc. In an embodiment, the power source circuit 270 can be charged by another power source, e.g., a high-capacity power bank, an adapter connected to mains electricity, or the like. The power source circuit 270 can also provide power, e.g., including the abovementioned first input power 212A and second input power 212B, to external devices through the switching regulators 230A and 230B.

In an embodiment, the first switching regulator 230A can convert the first input power 212A generated by the power source circuit 270 to a first output power 214A provided to the first connector 210A. The first switching regulator 230A can generate a synchronization signal $SG_1$ provided to the second switching regulator 230B. The synchronization signal $SG_1$ instructs the second switching regulator 230B to synchronize its operating state with an operating state of the first switching regulator 230A.

The second switching regulator 230B is coupled to the first switching regulator 230A. The second switching regulator 230B can convert the second input power 212B generated by the power source circuit 270 to a second output power 214B provided to the second connector 210B. The second switching regulator 230B can synchronize its operating state with an operating state of the first switching regulator 230A according to the synchronization signal $SG_1$.

In an embodiment, the PD controller 250 can control the first output power 214A and the second output power 214B according to a maximum output power $P_{max}$ of the power source circuit 270, so that the output power of the power source circuit 270 can be appropriately distributed to the first switching regulator 230A and the second switching regulator 230B. For example, the power management system 200 can power two devices through the first connector 210A and the second connector 210B at the same time. The first output power 214A is provided to one of the two devices, and the second output power 214B is provided to the other one of the two devices. If the first output power 214A is assumed to be 45 watts, and the maximum output power $P_{max}$ is assumed to be 100 watts, then the PD controller 250 can control the second output power 214B to be a value selected from a calculated range, e.g., less than 55 watts. The calculated range can be determined according to the maximum output power $P_{max}$ and the first output power 214A. The maximum value of the calculated range is the difference between the maximum output power $P_{max}$ and the first output power 214A (e.g., 100 W−45 W=55 W). Similarly, in another example, the PD controller 250 can control the first output power 214A according to a calculated range that is the difference between the maximum output power $P_{max}$ and the second output power 214B.

In an embodiment, when the power management system 200 powers two devices through the first connector 210A and the second connector 210B at the same time, the PD controller 250 can distribute the output power of the power source circuit 270 to the two devices according to the maximum output power $P_{max}$ of the power source circuit 270 to make full use of the power source circuit 270. More specifically, the PD controller 250 can control a sum of the first output power 214A and the second output power 214B to be equal to or approximately equal to the maximum output power $P_{max}$ of the power source circuit 270. In other words, when the power management system 200 powers the two devices through the first connector 210A and the second connector 210B at the same time, the output power of the power circuit 270 can be adjusted to the maximum output power $P_{max}$, thereby increasing the powering efficiency.

As used herein, "approximately equal to" means that a difference may exist among/between parameters (e.g., the sum of the output powers 214A and 214B, and the maximum output power $P_{max}$) because of, e.g., non-ideality of circuit components, and that the difference is relatively small and can be ignored.

In an embodiment, if the power source circuit 270 is controlled to power an electronic device through the first connector 210A, then the first switching regulator 230A can convert the first input power 212A to the first output power 214A. If the power source circuit 270 is controlled to be powered, e.g., charged, by an electronic device through the first connector 210A, then the first switching regulator 230A can convert a third input power 216A, from the first connector 210A, to a third output power 218A provided to the power source circuit 270. If the power source circuit 270 is controlled to power an electronic device through the second connector 210B, then the second switching regulator 230B can convert the second input power 212B to the second output power 214B. If the power source circuit 270 is controlled to be powered, e.g., charged, by an electronic device through the second connector 210B, then the second switching regulator 230B can convert a fourth input power 216B, from the second connector 210B, to a fourth output power 218B provided to the power source circuit 270.

As shown in FIG. 2, the PD controller 250 is coupled to the first connector 210A and the second connector 210B. If the first connector 210A is connected to an electronic device, the PD controller 250 can receive a first negotiation signal $NS_1$ generated by the electronic device through the first connector 210A. Similarly, if the second connector 210B is connected to an electronic device, the PD controller 250 can receive a second negotiation signal $NS_2$ generated by the electronic device through the second connector 210B. The PD controller 250 is further coupled to the first switching regulator 230A and the second switching regulator 230B. The PD controller 250 can control the first switching regulator 230A to adjust the first output power 214A according to the first negotiation signal $NS_1$ provided by the first connector 210A. The PD controller 250 can also control the second switching regulator 230B to adjust the second output power 214B according to the second negotiation signal $NS_2$ provided by the second connector 210B.

In an embodiment, the PD controller 250 can be implemented as a USB PD controller. Types of the connectors (including the first connector 210A and the first connector 210B) may include, but are not limited to: USB type-C, USB type-B, USB type-A, Micro-USB or Lightning.

In some embodiments, the power management systems 200 can be included and used in electronic devices such as smartphones, tablets, laptops, desktops, power banks, car charger ports, headphones, power tools, television monitors, and the like.

In an embodiment, the PD controller 250 and the first switching regulator 230A are integrated on a single chip. The chip can be referred to as a power management circuit, and an example of the power management circuit is illustrated in FIG. 4 below.

Figure 1:
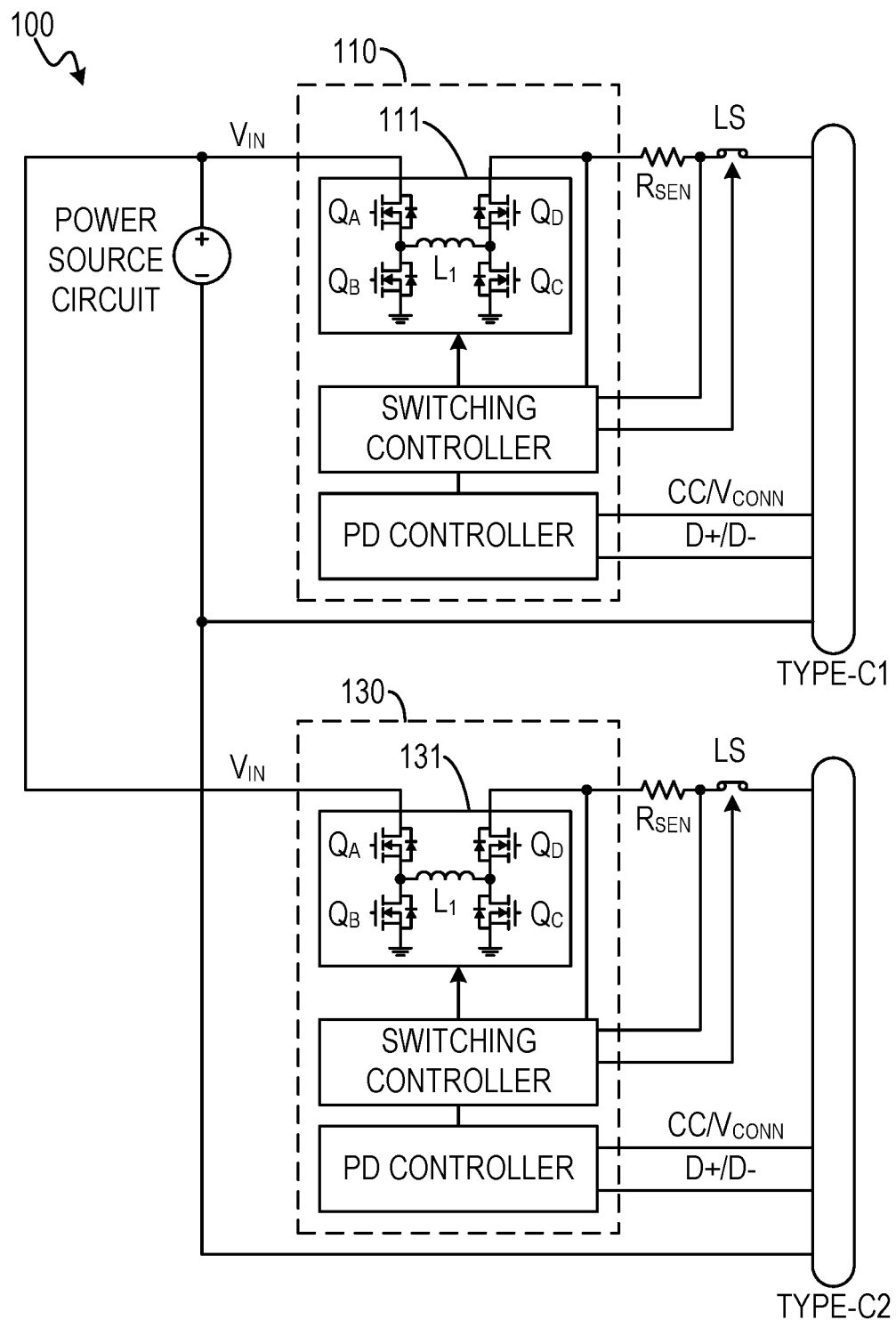
FIG. 1 illustrates a circuit diagram of a conventional power management system.

According to the above descriptions of the power management system 200, using the PD controller 250 to control the first switching regulator 230A and the second switching regulator 230B can avoid using two PD controllers, e.g., as shown in FIG. 1, to control the switching regulators, thereby reducing the number of electronic components, e.g., an extra microcontroller unit (MCU) and flash memory are not needed. In this way, the total BOM cost of the power management system 200 can be reduced. Additionally, the synchronization signal $SG_1$ is used to instruct the second switching regulator 230B to synchronize with the operating state of the first switching regulator 230A, so that the power management system 200 can reduce (or eliminate) EMI noises when the first switching regulator 230A and the second switching regulator 230B are operating in parallel.

Figure 3:
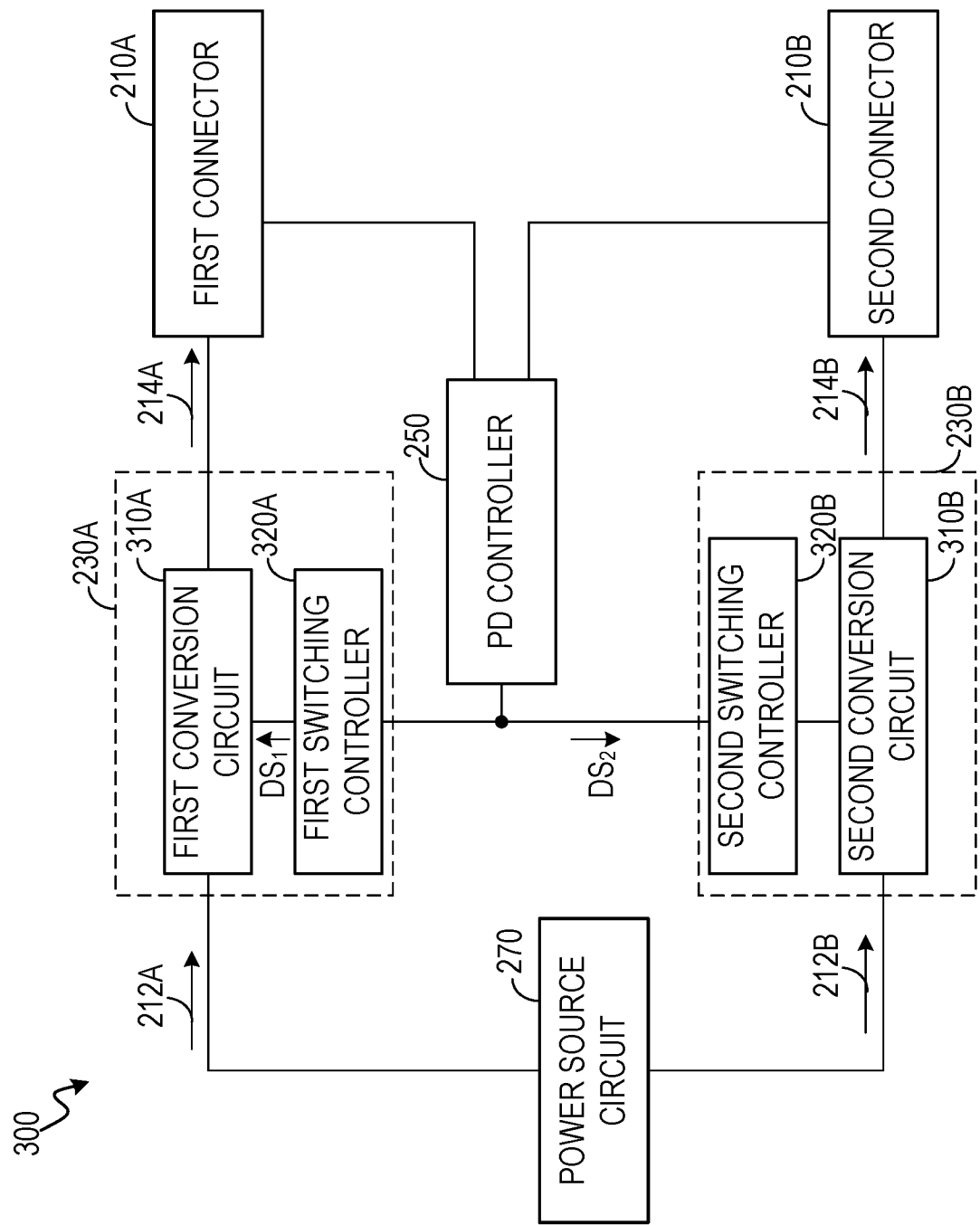
FIG. 3 illustrates a circuit diagram of an example of a power management system, in an embodiment of the present invention.

FIG. 3 illustrates a circuit diagram of an example of a power management system 300, in an embodiment of the present invention. FIG. 3 is described in combination with FIG. 2. As shown in FIG. 3, the power management system 300 includes the abovementioned first switching regulator 230A and the abovementioned second switching regulator 230B. The first switching regulator 230A includes a first conversion circuit 310A and a first switching controller 320A. The second switching regulator 230B includes a second conversion circuit 310B and a second switching controller 320B. In an embodiment, the first conversion circuit 310A can include a first set of switches and a first inductor coupled to the first set of switches (e.g., see FIG. 4). Similarly, the second conversion circuit 310B can include a second set of switches and a second inductor coupled to the second set of switches (e.g., see FIG. 4). The PD controller 250 is coupled to the first switching controller 320A and the second switching controller 320B.

In an embodiment, the first switching regulator 230A, e.g., the first switching controller 320A, can generate a first set of driving signals $DS_1$ to selectively turn on a switch of the first set of switches, such that (that is, by the first switching controller generating the first set of driving signals that turn on that switch) the first conversion circuit 310A can convert a first input power 212A to a first output power 214A. The first switching controller 320A can further generate a second set of driving signals $DS_2$ comprised in the abovementioned synchronization signal $SG_1$. The second switching regulator 230B, e.g., the second switching controller 320B, can selectively turn on a switch of the second set of switches according to the second set of driving signals $DS_2$, such that (that is, by the first switching controller generating the second set of driving signals to control the second switching controller that turns on that switch) the second conversion circuit 310B can convert a second input power 212B to a second output power 214B. More specifically, the first switching controller 320A can generate the first set of driving signals $DS_1$ and the second set of driving signals $DS_2$, and can provide the second set of driving signals $DS_2$ to the second switching controller 320B.

In an embodiment, the abovementioned operating state of the first switching regulator 230A includes a phase state and a frequency state. The first switching regulator 230A can control the first set of driving signals $DS_1$ and the second set of driving signals $DS_2$ to have a same frequency to synchronize a frequency state of the second switching regulator 230B with a frequency state of the first switching regulator 230A. The first switching regulator 230A can also control a phase shift between the first set of driving signals $DS_1$ and second set of driving signals $DS_2$ according to phase information stored in the first switching regulator 230A, to synchronize a phase state of the second switching regulator 230B with a phase state of the first switching regulator 230A. The phase information can cause the first set of driving signals $DS_1$ and the second set of driving signals $DS_2$ to be in phase or completely out of phase. In other words, the phase shift can include a value selected from the group consisting of zero degrees and 180 degrees. More specifically, the first switching controller 320A can control the first set of driving signals $DS_1$ and the second set of driving signals $DS_2$ to have a same frequency, and can control a phase shift between the first sets of driving signals $DS_1$ and second sets of driving signals $DS_2$ according to phase information, e.g., indicating a value of either zero degrees or 180 degrees, stored in the first switching controller 320A.

In an embodiment, a phase state or a phase of a signal, e.g., a pulse-width modulation (PWM) signal, means the position of a point in time (instant) on a waveform cycle of the PWM signal. For example, a complete cycle of the PWM signal is defined as 360 degrees of phase. A phase state of zero degrees of the PWM signal can indicate the time point at which the PWM signal starts a new cycle. A phase state of 180 degrees of the PWM signal indicates the time point in the middle of a timeline on a waveform cycle of the PWM signal. In an embodiment, a phase state or a phase of a set of driving signals can refer to a phase state of a PWM signal that controls the driving signals. In another embodiment, a phase state or a phase of a set of driving signals can refer to a phase state of a driving signal of the driving signals.

In an embodiment, a phase state of the power management system 300, e.g., a phase state of the two sets of driving signals $DS_1$ and $DS_2$, can be adjusted to be equal to or approximately equal to a phase state of another circuit module (not shown) coupled to the power management system 300 (e.g., a circuit module of an electronic system with system clock), and a frequency state of the power management system 300, e.g., a frequency state of the two set of driving signals $DS_1$ and $DS_2$, can be adjusted to be equal to or approximately equal to a frequency state of the other circuit module. The electronic system with system clock can include a car central control entertainment system, a laptop system, an outdoor power system, or the like.

More specifically, a phase shift between the two set of driving signals $DS_1$ and $DS_2$ can be controlled to be zero degrees, and the driving signals $DS_1$ and $DS_2$ can be further controlled to have the same frequency and phase state as those of the other circuit module. In this way, signal interference between the power management system 300 and the other circuit module can be reduced, and EMI noises from the power management system 300 can be reduced when the power management system 300 and the other circuit module are operating in parallel.

As used above, "approximately equal to" means that a difference may exist between parameters (e.g., the phase state of the power management system 300 and the phase state of the other circuit module) because of, e.g., non-ideality of circuit components, and that the difference is relatively small and can be ignored.

In an embodiment, the first set of driving signals $DS_1$ and the second set of driving signals $DS_2$ can be controlled to have the same frequency, and the phase shift between the two set of driving signals $DS_1$ and $DS_2$ can be controlled to be 180 degrees. In this way, the signal interference between the first switching regulator 230A and the second switching regulator 230B can be reduced, thereby reducing EMI noises from the power management system 300 when the first switching regulator 230A and the second switching regulator 230B are operating in parallel.

Figure 4:
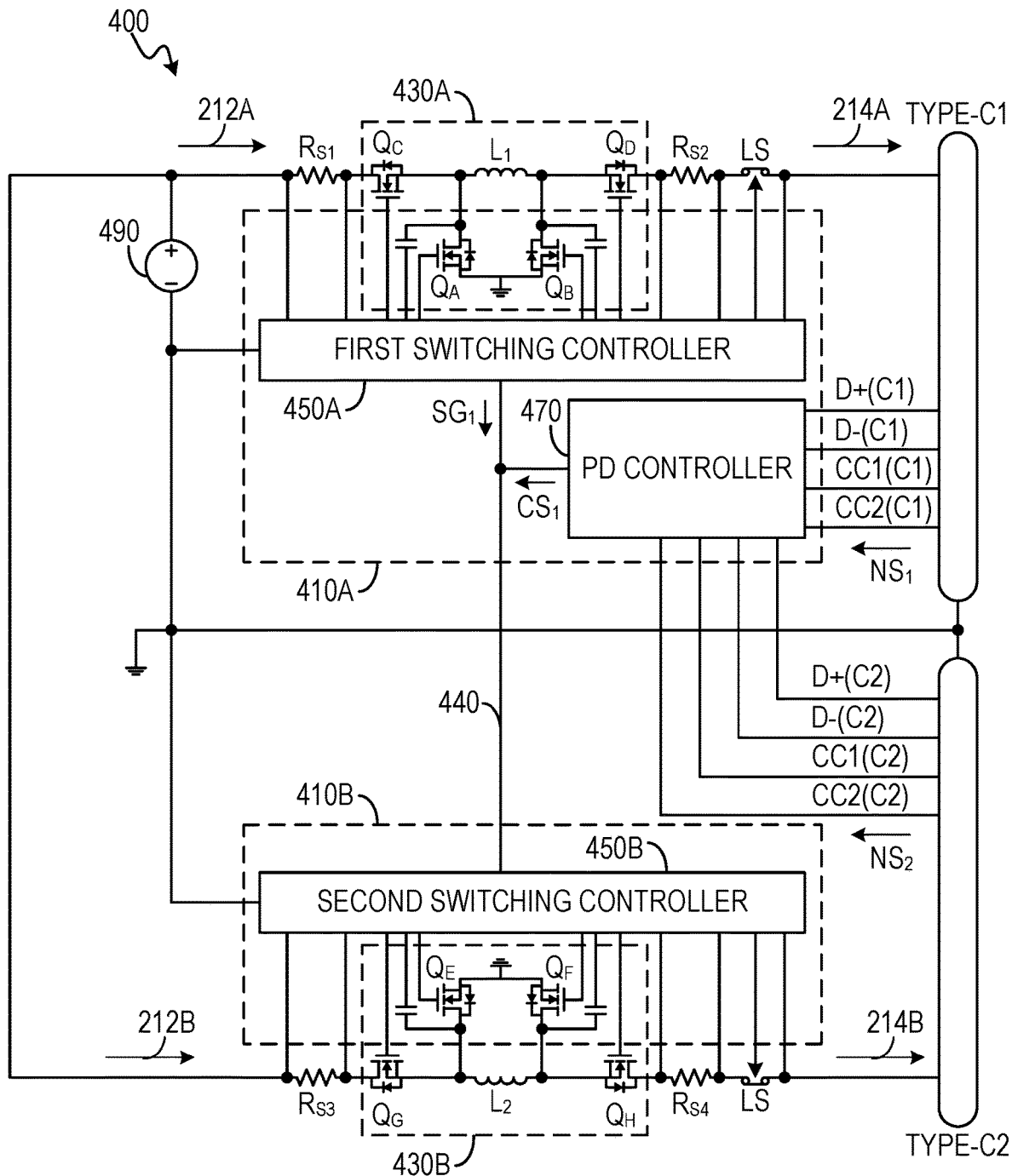
FIG. 4 illustrates a circuit diagram of an example of a power management system, in an embodiment of the present invention.

FIG. 4 illustrates a circuit diagram of an example of a power management system 400, in an embodiment of the present invention. As shown in FIG. 4, the power management system 400 includes a first conversion circuit 430A, a first switching controller 450A, a PD controller 470, a second conversion circuit 430B, a second switching controller 450B, and a power source circuit 490. The power management system 400 may further include a first USB type-C connector (e.g., TYPE-C1 shown in FIG. 4), and a second USB type-C connector (e.g., TYPE-C2 shown in FIG. 4). FIG. 4 is described in combination with FIG. 2 and FIG. 3.

More specifically, the first conversion circuit 430A can be an embodiment of the abovementioned first conversion circuit 310A. As shown in FIG. 4, the first conversion circuit 430A includes a first set of switches (e.g., including switches $Q_A$, $Q_B$, $Q_C$ and $Q_D$), and an inductor $L_1$. The switches $Q_A$, $Q_B$, $Q_C$ and $Q_D$ can be examples of the abovementioned first set of switches in the first conversion circuit 310A. The inductor $L_1$ can be an example of the abovementioned first inductor in the first conversion circuit 310A. Similarly, the second conversion circuit 430B can be an embodiment of the abovementioned second conversion circuit 310B. As shown in FIG. 4, the second conversion circuit 430B includes a second set of switches (e.g., including switches $Q_E$, $Q_F$, $Q_G$ and $Q_H$), and an inductor $L_2$. The switches $Q_E$, $Q_F$, $Q_G$ and $Q_H$ can be examples of the abovementioned second set of switches in the second conversion circuit 310B. The inductor $L_2$ can be an example of the abovementioned second inductor in the second conversion circuit 310B. In the example of FIG. 4, the switches $Q_A$, $Q_B$, $Q_C$, $Q_D$, $Q_E$, $Q_F$, $Q_G$ and $Q_H$ include metal-oxide-semiconductor field-effect transistors (MOSFETs).

In an embodiment, the PD controller 470, the first switching controller 450A, and a part of the first conversion circuit 430A (e.g., the part including transistors $Q_A$ and $Q_B$) can be integrated on a single (first) chip (e.g., referred to as a first power management circuit 410A). The second switching controller 450B and a part of the second conversion circuit 430B (e.g., the part including transistors $Q_E$ and $Q_F$) can be integrated on a single (second) chip (e.g., referred to as a second power management circuit 410B).

In an embodiment, a combined circuit of the first conversion circuit 430A and the first switch controller 450A can be an embodiment of the abovementioned first switching regulator 230A. A combined circuit of the second conversion circuit 430B and the second switch controller 450B can be an embodiment of the abovementioned second switching regulator 230B. The connector TYPE-C1 can be an embodiment of the abovementioned first connector 210A. The connector TYPE-C2 can be an embodiment of the abovementioned second connector 210B. The PD controller 470 can be an embodiment of the abovementioned PD controller 250. The power source circuit 490 can be an embodiment of the abovementioned power source circuit 270.

As shown in FIG. 4, in an embodiment, the first power management circuit 410A includes a communication channel 440. The communication channel 440 is coupled to the PD controller 470, the first switching controller 450A, and the second switching controller 450B. The first switching controller 450A can control the first conversion circuit 430A to convert a first input power 212A, from the power source circuit 490, to a first output power 214A that is provided to the connector TYPE-C1. The PD controller 470 can control the first switching controller 450A to adjust the first output power 214A according to a first negotiation signal $NS_1$ provided by the connector TYPE-C1. The first switching controller 450A can also generate the abovementioned synchronization signal $SG_1$. The communication channel 440 can transfer the synchronization signal $SG_1$ to the second switching controller 450B to synchronize an operating state, e.g., including a frequency and/or a phase, of the second switching controller 450B with an operating state of the first switching controller 450A. The PD controller 470 can generate a control signal $CS_1$. The communication channel 440 can transfer the control signal $CS_1$ to the second switching controller 450B. The control signal $CS_1$ can instruct the second switching controller 450B to control the second conversion circuit 430B to convert a second input power 212B, from the power source circuit 490, to a second output power 214B that is provided to the connector TYPE-C2. The control signal $CS_1$ can also instruct the second switching controller 450B to adjust the second output power 214B according to a second negotiation signal $NS_2$ provided by the connector TYPE-C2.

In an embodiment, the communication channel 440 can be implemented based on standard protocols, such as inter-integrated circuit (I2C), universal asynchronous receiver/transmitter (UART), serial peripheral interface (SPI), or any proprietary protocol. In other words, the communication channel 440 can include an I2C bus, an UART bus, an SPI bus, or the like.

In an embodiment, the abovementioned first switching regulator 230A includes a circuit having a structure approximately the same as that of a circuit in the abovementioned second switching regulator 230B. More specifically, as shown in FIG. 4, the first switching controller 450A includes a circuit having a structure approximately the same as that of a circuit in the second switching controller 450B. The first conversion circuit 430A includes a circuit having a structure approximately the same as that of a circuit in the second conversion circuit 430B. In this way, the system design can be simplified and the electrical characteristics of the first switching regulator 230A and the second switching regulator 230B can be matched.

In an embodiment, a first circuit having a structure approximately the same as that of a second circuit means that the electronic components in the first circuit and the corresponding electronic components in the second circuit have the same parameter values, and that the connection relationship between the electronic components in the first circuit is the same as that between the corresponding electronic components in the second circuit.

In an embodiment, the abovementioned first set of switches in the first conversion circuit 430A include a first set of external transistors and a first set of internal transistors. The first set of internal transistors is integrated on a first chip, and is coupled to the first set of external transistors outside the first chip. Additionally, a maximum operating voltage of the first set of internal transistors is less than a maximum operating voltage of the first set of external transistors. More specifically, as shown in FIG. 4, the first set of external transistors includes transistors $Q_C$ and $Q_D$. The first set of internal transistors includes transistors $Q_A$ and $Q_B$.

In an embodiment, the transistors $Q_A$ and $Q_B$ are coupled to the reference ground, and can have relatively small maximum operating voltages compared to the maximum operating voltage of the transistors $Q_C$ and $Q_D$. Thus, the die sizes for the transistors $Q_A$ and $Q_B$ can be much smaller than the die sizes for the transistors $Q_C$ and $Q_D$, and the transistors $Q_A$ and $Q_B$ can be integrated on a chip, e.g., a semiconductor chip, with other components such as the switching controller 450A and the PD controller 470 in the first power management circuit 410A. As a result, the size of the printed circuit board (PCB) of the power management system 400 can be reduced, and the cost of the system 400 can also be reduced.

Similarly, the abovementioned second set of switches in the second conversion circuit 430B can include a second set of external transistors and a second set of internal transistors. The second set of internal transistors is integrated on a second chip, and is coupled to the second set of external transistors outside the second chip. Additionally, a maximum operating voltage of the second set of internal transistors is less than a maximum operating voltage of the second set of external transistors. More specifically, as shown in FIG. 4, the second set of external transistors includes transistors $Q_G$ and $Q_H$. The second set of internal transistors includes transistors $Q_E$ and $Q_F$. In an embodiment, the transistors $Q_E$ and $Q_F$ are coupled to the reference ground, and can have relatively small maximum operating voltages compared to the maximum operating voltage of the transistors $Q_G$ and $Q_H$. Thus, the die sizes for the transistors $Q_E$ and $Q_F$ can be much smaller than the die sizes for the transistors $Q_G$ and $Q_H$, and the transistors $Q_E$ and $Q_F$ can be integrated on a chip, e.g., a semiconductor chip, with some other components such as the switching controller 450B in the second power management circuit 410B. As a result, the size of the PCB of the power management system 400 can be reduced, and the cost of the system 400 also can be reduced.

Figure 5:
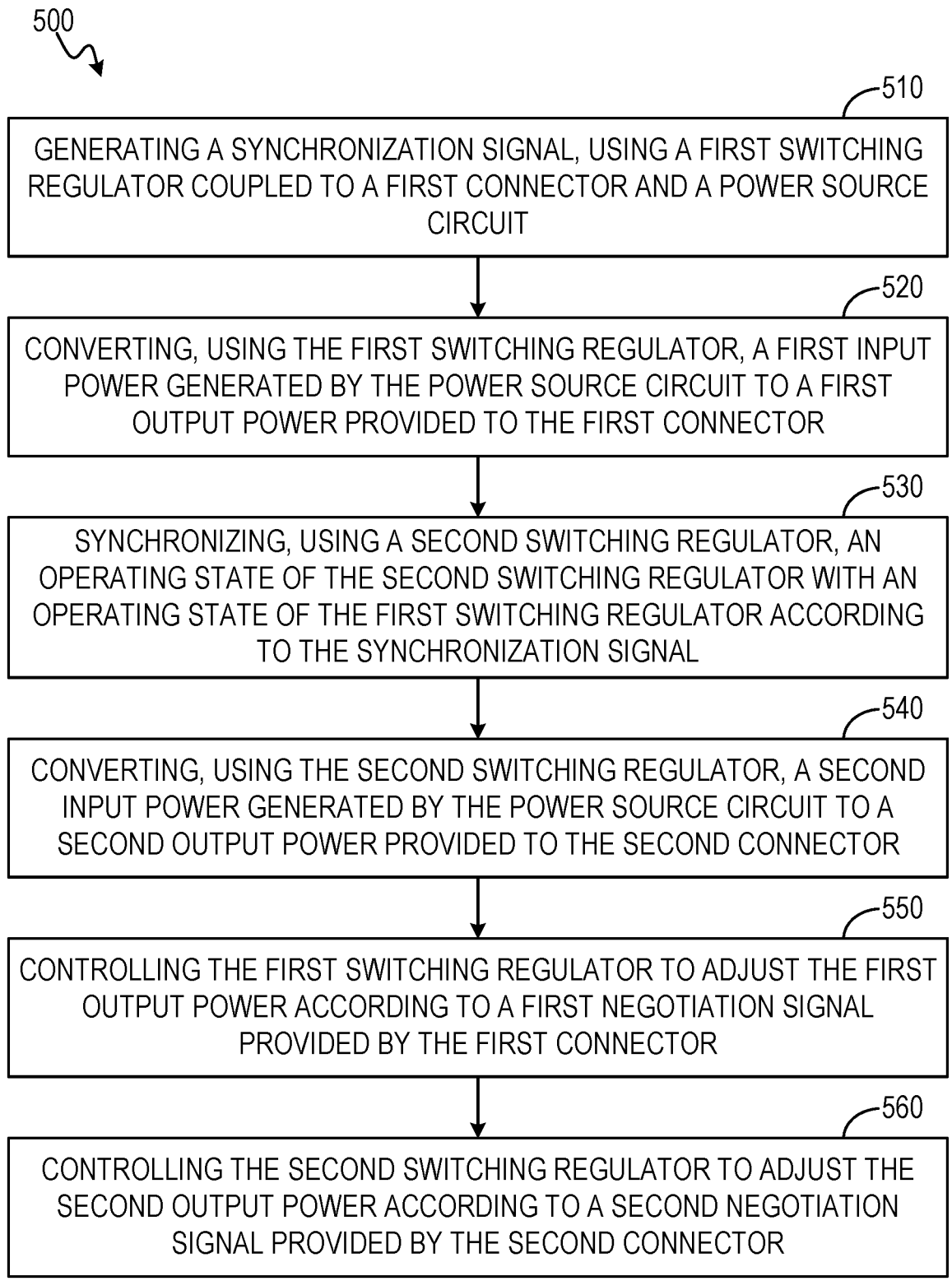
FIG. 5 illustrates a flowchart of an example of a method of managing power, in an embodiment of the present invention.

FIG. 5 illustrates a flowchart 500 of an example of a method of managing power, in an embodiment of the present invention. Although specific steps are disclosed in FIG. 5, such steps are examples for illustrative purposes. That is to say, embodiments according to the present invention are well suited to performing various other steps or variations of the steps recited in FIG. 5. FIG. 5 is described in combination with FIG. 2, FIG. 3, and FIG. 4.

At step 510, the first switching regulator 230A generates a synchronization signal, e.g., $SG_1$.

At step 520, the first switching regulator 230A converts a first input power 212A generated by the power source circuit 270 to a first output power 214A that is provided to the first connector 210A.

At step 530, the second switching regulator 230B synchronizes an operating state of the second switching regulator 230B with an operating state of the first switching regulator 230A according to the synchronization signal $SG_1$.

At step 540, the second switching regulator 230B converts a second input power 212B generated by the power source circuit 270 to a second output power 214B that is provided to the second connector 210B.

At step 550, the PD controller 250 controls the first switching regulator 230A to adjust the first output power 214A according to a first negotiation signal, e.g., $NS_1$ provided by the first connector 210A.

At step 560, the PD controller 250 controls the second switching regulator 230B to adjust the second output power 214B according to a second negotiation signal, e.g., $NS_2$ provided by the second connector 210B.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

We claim:

1. A power management system, comprising:
a first switching regulator configured to convert a first input power generated by a power source circuit to a first output power that is provided to a first connector, and further configured to generate a synchronization signal;
a second switching regulator, coupled to said first switching regulator, configured to convert a second input power generated by said power source circuit to a second output power that is provided to a second connector, and further configured to synchronize an operating state of said second switching regulator with an operating state of said first switching regulator according to said synchronization signal; and
a controller, coupled to said first switching regulator and said second switching regulator, configured to control said first switching regulator to adjust said first output power according to a first negotiation signal provided by said first connector, and further configured to control said second switching regulator to adjust said second output power according to a second negotiation signal provided by said second connector.

2. The power management system of claim 1, wherein said first switching regulator comprises a first plurality of switches and a first inductor coupled to said first plurality of switches, wherein said first switching regulator is configured to generate a first set of driving signals to selectively turn on a switch of said first plurality of switches, thereby converting said first input power to said first output power, and is further configured to generate a second set of driving signals comprised in said synchronization signal,
and wherein said second switching regulator comprises a second plurality of switches and a second inductor coupled to said second plurality of switches, and is configured to selectively turn on a switch of said second plurality of switches according to said second set of driving signals, thereby converting said second input power to said second output power.

3. The power management system of claim 2, wherein said operating state of said first switching regulator comprises a phase state and a frequency state, wherein said first switching regulator controls said first set of driving signals and said second set of driving signals to have a same frequency to synchronize a frequency state of said second switching regulator with said frequency state of said first switching regulator, wherein said first switching regulator also controls a phase shift between said first and second sets of driving signals according to phase information stored in said first switching regulator to synchronize a phase state of said second switching regulator with said phase state of said first switching regulator, and wherein said phase shift comprises a value selected from the group consisting of zero degrees and 180 degrees.

4. The power management system of claim 2, wherein said first switching regulator comprises a circuit having a structure approximately the same as that of a circuit in said second switching regulator.

5. The power management system of claim 4, wherein said first plurality of switches comprises a first set of external transistors and a first set of internal transistors, wherein said first set of internal transistors is integrated on a first chip and is coupled to said first set of external transistors that is outside said first chip, wherein a maximum operating voltage of said first set of internal transistors is less than a maximum operating voltage of said first set of external transistors, wherein said second plurality of switches comprises a second set of external transistors and a second set of internal transistors, wherein said second set of internal transistors is integrated on a second chip and is coupled to said second set of external transistors that is outside said second chip, and wherein a maximum operating voltage of said second set of internal transistors is less than a maximum operating voltage of said second set of external transistors.

6. The power management system of claim 1, wherein said controller is configured to control said first output power and said second output power according to a maximum output power of said power source circuit.

7. The power management system of claim 6, wherein said controller controls a sum of said first output power and said second output power to be approximately equal to said maximum output power.

8. The power management system of claim 1, wherein said controller and said first switching regulator are integrated on a chip.

9. The power management system of claim 1, wherein if said power source circuit is controlled to power an electronic device through said first connector, then said first switching regulator is configured to convert said first input power to said first output power, wherein if said power source circuit is controlled to be powered by an electronic device through said first connector, then said first switching regulator is configured to convert a third input power, from said first connector, to a third output power that is provided to said power source circuit, wherein if said power source circuit is controlled to power an electronic device through said second connector, then said second switching regulator is configured to convert said second input power to said second output power, and wherein if said power source circuit is controlled to be powered by an electronic device through said second connector, then said second switching regulator is configured to convert a fourth input power, from said second connector, to a fourth output power that is provided to said power source circuit.

10. A power management circuit, comprising:
a first switching controller configured to generate a synchronization signal, and further configured to control a first conversion circuit to convert a first input power, from a power source circuit, to a first output power that is provided to a first connector;
a power delivery (PD) controller, coupled to said first switching controller, and configured to control said first switching controller to adjust said first output power according to a first negotiation signal provided by said first connector; and
a communication channel, coupled to said PD controller and said first switching controller, configured to provide said synchronization signal from said first switching controller to a second switching controller to synchronize an operating state of said second switching controller with an operating state of said first switching controller, wherein said communication channel is further configured to provide a control signal, generated by said PD controller, to said second switching controller, wherein said control signal causes said second switching controller to control a second conversion circuit to convert a second input power, from said power source circuit, to a second output power that is provided to a second connector, and wherein said control signal also causes said second switching controller to adjust said second output power according to a second negotiation signal provided by said second connector.

11. The power management circuit of claim 10, wherein said first switching controller is configured to generate a first set of driving signals to selectively turn on a switch of a first plurality of switches coupled to a first inductor, in said first conversion circuit, whereby said first conversion circuit converts said first input power to said first output power, wherein said first switching controller is further configured to generate a second set of driving signals comprised in said synchronization signal, and wherein said control signal further causes said second switching controller to selectively turn on a switch of a second plurality of switches coupled to a second inductor, in said second conversion circuit, according to said second set of driving signals, whereby said second conversion circuit converts said second input power to said second output power.

12. The power management circuit of claim 11, wherein said operating state of said first switching controller comprises a phase state and a frequency state, wherein said first switching controller controls said first set of driving signals and said second set of driving signals to have a same frequency, thereby synchronizing a frequency state of said second switching controller with said frequency state of said first switching controller, wherein said first switching controller further controls a phase shift between said first and second sets of driving signals according to phase information stored in said first switching controller, thereby synchronizing a phase state of said second switching controller with said phase state of said first switching controller, and wherein said phase shift is selected from the group consisting of zero degrees and 180 degrees.

13. The power management circuit of claim 11, wherein said first plurality of switches comprise a first set of external transistors and a first set of internal transistors, wherein said first set of internal transistors is integrated in said first switching controller and is coupled to said first set of external transistors outside said first switching controller, and wherein a maximum operating voltage of said first set of internal transistors is less than a maximum operating voltage of said first set of external transistors.

14. The power management circuit of claim 10, wherein said PD controller is configured to control said first output power and said second output power according to a maximum output power of said power source circuit.

15. The power management circuit of claim 14, wherein said PD controller controls a sum of said first output power and said second output power to be approximately equal to said maximum output power.

16. The power management circuit of claim 10, wherein if said power source circuit is controlled to power an electronic device through said first connector, then said first switching controller is configured to control said first conversion circuit to convert said first input power to said first output power, and wherein if said power source circuit is controlled to be powered by an electronic device through said first connector, then said first switching controller is configured to control said first conversion circuit to convert a third input power, from said first connector, to a third output power that is provided to said power source circuit.

17. A method of managing power, said method comprising:

generating a synchronization signal, using a first switching regulator coupled to a first connector and a power source circuit;

converting, using said first switching regulator, a first input power generated by said power source circuit to a first output power that is provided to said first connector;

synchronizing, using a second switching regulator, an operating state of said second switching regulator with an operating state of said first switching regulator according to said synchronization signal, wherein said second switching regulator is coupled to said first switching regulator, a second connector, and said power source circuit;

converting, using said second switching regulator, a second input power generated by said power source circuit to a second output power that is provided to said second connector;

controlling said first switching regulator to adjust said first output power according to a first negotiation signal provided by said first connector; and controlling said second switching regulator to adjust said second output power according to a second negotiation signal provided by said second connector.

18. The method of claim 17, wherein said first switching regulator comprises a first plurality of switches and a first inductor coupled to said first plurality of switches, wherein said second switching regulator comprises a second plurality of switches and a second inductor coupled to said second plurality of switches, and wherein said method further comprises:

generating, using said first switching regulator, a first set of driving signals to selectively turn on a switch of said first plurality of switches, thereby converting said first input power to said first output power;

generating, using said first switching regulator, a second set of driving signals comprised in said synchronization signal; and selectively turning on, using said second switching regulator, a switch of said second plurality of switches according to said second set of driving signals, thereby converting said second input power to said second output power.

19. The method of claim 18, wherein said operating state of said first switching regulator comprises a phase state and a frequency state, and wherein said method further comprises:

controlling, using said first switching regulator, said first set of driving signals and said second set of driving signals to have a same frequency, thereby synchronizing a frequency state of said second switching regulator with said frequency state of said first switching regulator; and controlling, using said first switching regulator, a phase shift between said first and second sets of driving signals according to phase information stored in said first switching regulator, thereby synchronizing a phase state of said second switching regulator with said phase state of said first switching regulator, and wherein said phase shift is selected from the group consisting of zero degrees and 180 degrees.

20. The method of claim 17, further comprising:

controlling said first output power and said second output power according to a maximum output power of said power source circuit.

* * * * *